(12) United States Patent
Fraction

(10) Patent No.: US 11,618,592 B1
(45) Date of Patent: Apr. 4, 2023

(54) MODULAR ARCHITECTURE FOR AN EXTENSIBLE SMALLSAT (MARES) COMMAND AND DATA HANDLING HARDWARE

(71) Applicant: United States of America as represented by the Administrator of NASA, Washington, DC (US)

(72) Inventor: James E. Fraction, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 302 days.

(21) Appl. No.: 17/023,505

(22) Filed: Sep. 17, 2020

(51) Int. Cl.
| | | |
|---|---|---|
| *B64G 1/24* | (2006.01) | |
| *G01S 19/42* | (2010.01) | |
| *G06F 3/06* | (2006.01) | |
| *G06F 11/10* | (2006.01) | |
| *G06F 13/20* | (2006.01) | |
| *G06F 13/42* | (2006.01) | |
| *G06F 1/28* | (2006.01) | |

(52) U.S. Cl.
CPC ............... *B64G 1/24* (2013.01); *G01S 19/42* (2013.01); *G06F 3/0604* (2013.01); *G06F 3/0659* (2013.01); *G06F 3/0679* (2013.01); *G06F 11/1068* (2013.01); *G06F 13/20* (2013.01); *G06F 13/4282* (2013.01); *B64G 2001/247* (2013.01); *G06F 1/28* (2013.01)

(58) Field of Classification Search
CPC .................................. G06F 9/445; G06F 11/14
See application file for complete search history.

(56) References Cited

U.S. PATENT DOCUMENTS

| | | | | |
|---|---|---|---|---|
| 2011/0107158 | A1* | 5/2011 | Espinosa | G06F 11/106 714/54 |
| 2015/0370579 | A1* | 12/2015 | Judd | G06F 11/0739 713/100 |
| 2017/0031668 | A1* | 2/2017 | Kikuchi | H04L 67/01 |
| 2018/0300652 | A1* | 10/2018 | Izumi | G06N 3/08 |
| 2019/0155767 | A1* | 5/2019 | Cheong | G06F 13/1694 |

* cited by examiner

Primary Examiner — Getente A Yimer
(74) Attorney, Agent, or Firm — Christopher O. Edwards; Trenton J. Roche

(57) ABSTRACT

The present invention relates to a modular architecture for a resilient extensible SmallSat (MARES) command and data handling (C&DH) device used in a spacecraft, the modular architecture which conforms to a 1U CubeSat board area form factor, including: a C&DH processor card disposed on a backplane of the form factor; a C&DH processor card disposed on a backplane of the form factor; a fault tolerant field programmable gate array (FPGA) disposed on the C&DH processor card, the FPGA including an embedded fault tolerant memory controller, and a soft-core processor which runs core flight software on a real-time executive for a multiprocessor operating system; and a C&DH auxiliary card disposed on the backplane and used in conjunction with the C&DH processor card, to provide processing capability for the spacecraft, the auxiliary card which contains peripheral interface drivers and read electronics for monitoring a health and safety of the spacecraft.

17 Claims, 3 Drawing Sheets

MODULAR ARCHITECTURE FOR AN EXTENSIBLE SMALLSAT (MARES) COMMAND AND DATA HANDLING HARDWARE

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a modular architecture for a resilient extensible SmallSat (MARES) command and data handling (C&DH) hardware, where the C&DH design accommodates multiple configurations depending upon mission needs, and fits within less than a. 1U (10 cm×10 cm×10 cm) CubeSat form factor using a combination of robust radiation tolerant components and commercial off-the-shelf (COTS) components.

2. Description of the Related Art

In today's rapidly advancing technology roadmap for space applications, there is an emphasis on completing missions faster, cheaper, and better than previous large-scale space missions. As part of this effort, the focus has shifted from using all radiation tolerant-'radiation hardened and highly screened parts to more commercial off-the-shelf (COTS) components for space missions that can last at least one year in orbit.

However, there are some portions of a spacecraft's avionics, such as the Command and Data Handling (C&DH) system, that need to have some level of reliability that goes beyond the current capabilities of COTS parts that are currently available. While there are a number of COTS components that can withstand a total ion dose (TID) of tens of kilorads of radiation in space, there is still some concern about the handling of single event effects (SEE).

In order to address this concern, a C&DH system that will utilize a radiation tolerant reprogrammable field programmable gate array (FPGA) device, and that will provide a great deal of design flexibility, is needed. In addition, a device that can outperform the TID/SEE radiation ratings of reprogrammable COTS field programmable gate array (FPGA) devices currently available on the market, and which can be the centerpiece of a next generation C&DH board design, and that combines the use of COTS parts with some core radiation tolerant components that can be integrated with other board designs to expand design functionality, is desired.

SUMMARY OF THE INVENTION

The present invention relates to a modular architecture for a resilient extensible SmallSat (MARES) command and data handling (C&DH) hardware, where the C&DH design accommodates multiple configurations depending upon mission needs, and fits within less than a U (10 cm×10 cm×10 cm) CubeSat form factor using a combination of robust radiation tolerant components and commercial off-the-shelf (COTS) components.

In one embodiment, the MARES of the present invention is a SmallSat architecture that addresses space mission radiation tolerance and reliability issues, while also minimizing development cost and schedule. In one embodiment, the C&DH hardware is a core element of the MARES architecture and includes two boards that process the data associated with basic and essential functions of the spacecraft bus; i.e., the C&DH processor card and the auxiliary card.

In one embodiment, the processor card of the present invention includes a reprogrammable field programmable gate array (FPGA) that contains a soft-core processor running flight software (FSW) based on NASA GSFC's Core Flight System (cFS).

In one embodiment, the processor card can be configured to implement a variety of serial communication interfaces including RS-422, serial peripheral interface (SPI), controller area network (CAN), low voltage differential signaling (LVDS) (which can be used to implement the SpaceWire protocol), and multi-Gbps serializer/deserializer (SERDES). There are also a number of available general-purpose input/output (GPIO) signals.

In one embodiment, the processor card interfaces with an auxiliary card that contains the analog circuitry that converts temperature, voltage, and current data collected from multiple points within a 6U satellite to a digital format that can be processed, stored, and downlinked using the front end communication interface.

In one embodiment, the auxiliary card also has multiple miniaturized components including a telemetry controller, a micro-dosimeter, micro-global positioning system (GPS) device, two 3-Amp heater services, and an optional daughter card assembly slot that allows a custom printed circuit board to be soldered directly onto the auxiliary card.

In one embodiment, the present invention relates to a modular architecture for a resilient extensible SmallSat (MARES) command and data handling (C&DH) device used in a spacecraft, the modular architecture which conforms to a 1U CubeSat board area form factor, including: a C&DH processor card disposed on a backplane of the form factor; a C&DH processor card disposed on a backplane of the form factor; a fault tolerant field programmable gate array (FPGA) disposed on the C&DH processor card, the FPGA including an embedded fault tolerant memory controller, and a soft-core processor which runs core flight software on a real-time executive for a multiprocessor operating system; and a C&DH auxiliary card disposed on the backplane and used in conjunction with the C&DH processor card, to provide processing capability for the spacecraft, the auxiliary card which contains peripheral interface drivers and read electronics for monitoring a health and safety of the spacecraft.

In one embodiment, the C&DH processor card further includes: an open pin field array backplane connector which plugs the C&DH processor card into the backplane of the form factor.

In one embodiment, the C&DH processor card further includes: a flash memory device directly connected to the FPGA, the flash memory device which stores algorithms and application codes, including code for the flight software, and operating system (OS) boot images; and a power switch capable of power cycling the flash memory device.

In one embodiment, an error correction code is implemented by the embedded fault tolerant memory controller within the FPGA to preserve data stored in the flash memory device.

In one embodiment, the C&DH processor card further includes: a static random-access memory (SRAM) device, directly connected to the FPGA, runs applications of the flight software; wherein the SRAM device has a built-in error detection and correction (EDAC) capability which allows the SRAM device to internally scrub memory data whenever the FPGA completes a read activity.

In one embodiment, the C&DH processor card further includes: an electrically erasable programmable read-only memory (EEPROM) device which increases a non-volatile memory density used to store a boot code of the C&DH processor card; wherein an error correction code is implemented by the embedded fault-tolerant memory controller within the FPGA to preserve data stored in the EEPROM device.

In one embodiment, the C&DH processor card further includes: a plurality of serial interfaces implemented by the FPGA, including: a plurality of RS-422 interfaces which are configured as low voltage differential signaling (LVDS) pairs, to send driver signals from the FPGA to an RS-422 transmitter and receive an RS-422 signal from an RS-422 receiver; and a plurality of general-purpose input/output (GPIO) signals used to interface the C&DH processor card to the C&DH auxiliary card.

In one embodiment, the C&DH processor card interfaces with the C&DH auxiliary card, the C&DH auxiliary card which contains analog circuitry that converts temperature, voltage, and current data collected from multiple points within a 6U satellite to a digital format that is processed, stored, and downlinked using a front end communication interface.

In one embodiment, the C&DH auxiliary card further includes: a daughter card assembly slot which allows a daughter printed circuit board to be soldered directly onto the C&DH auxiliary card.

In one embodiment, the C&DH auxiliary card further includes: a telemetry controller which monitors the health and safety of the spacecraft; a micro-dosimeter which monitors real-time total ionizing dose (HD) radiation measurements while in-flight; and an on-board micro-global positioning system (GPS) device.

In one embodiment, the C&DH auxiliary card further includes: a plurality of RS-422 transceivers; and a plurality of separate 3-Amp heater services.

In one embodiment, the C&DH auxiliary card further includes: a plurality of thermistor parallel resistors connected to the telemetry controller; a voltage telemetry connected to the telemetry controller; and a plurality of local voltage monitors which monitor the telemetry, controller.

In one embodiment, the modular architecture for the MARES C&DH device further includes a plurality of processor cards disposed on the backplane; wherein the C&DH processor card programs the plurality of other cards disposed on the backplane.

In one embodiment, the C&DH processor card further includes: a plurality of linear regulators used with the SRAM; and a buck regulator which generates a core voltage for the FPGA.

In one embodiment, the C&DH processor card further includes: a reset supervisory chip which monitors C&DH processor board voltage levels and provides a reset for the FPGA.

In one embodiment, the plurality of RS-422 interfaces are used as processor and software debug interfaces, and universal asynchronous receiver-transmitter (DART) interfaces.

In one embodiment, the C&DH processor card further includes: a controller area network (CAN) transceiver; and a plurality of CAN bus interfaces; where the CAN transceiver receives signals from the FPGA via the plurality of CAN bus interfaces In one embodiment, the C&DH processor card further includes: a plurality of low-voltage complementary metal oxide semiconductor (LVCMOS) signal outputs and inputs which can be used to control the two 3-Amp heater services on the auxiliary card, implement reset outputs, spacecraft operation enable outputs and confirmation inputs, and watchdog signals.

In one embodiment, the C&DH processor card further includes: a plurality of H-bridge electronic circuit drivers implemented by the LVCMOS signal outputs and inputs, that control the spacecraft.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to a modular architecture for a resilient extensible SmallSat (MARES) command and data handling (C&DH) hardware, where the C&DH design accommodates multiple configurations depending upon mission needs, and fits within less than a 1U (10 cm×10 cm×10 cm) CubeSat form factor volume using a combination of robust radiation tolerant components and commercial off-the-shelf (COTS) components.

The MARES C&DH hardware of the present invention addresses space mission radiation tolerance and reliability issues and includes a capabilities-driven design and architecture with an emphasis on reliability, scalability, and high-performance processing, while also minimizing development cost and schedule. The present invention can be targeted to a variety of applications including SmallSat buses, CubeSat buses; spacecrafts with mass and size that exceed those of a typical SmallSat spacecraft, or even high-performance instrument processors.

Figure 1:
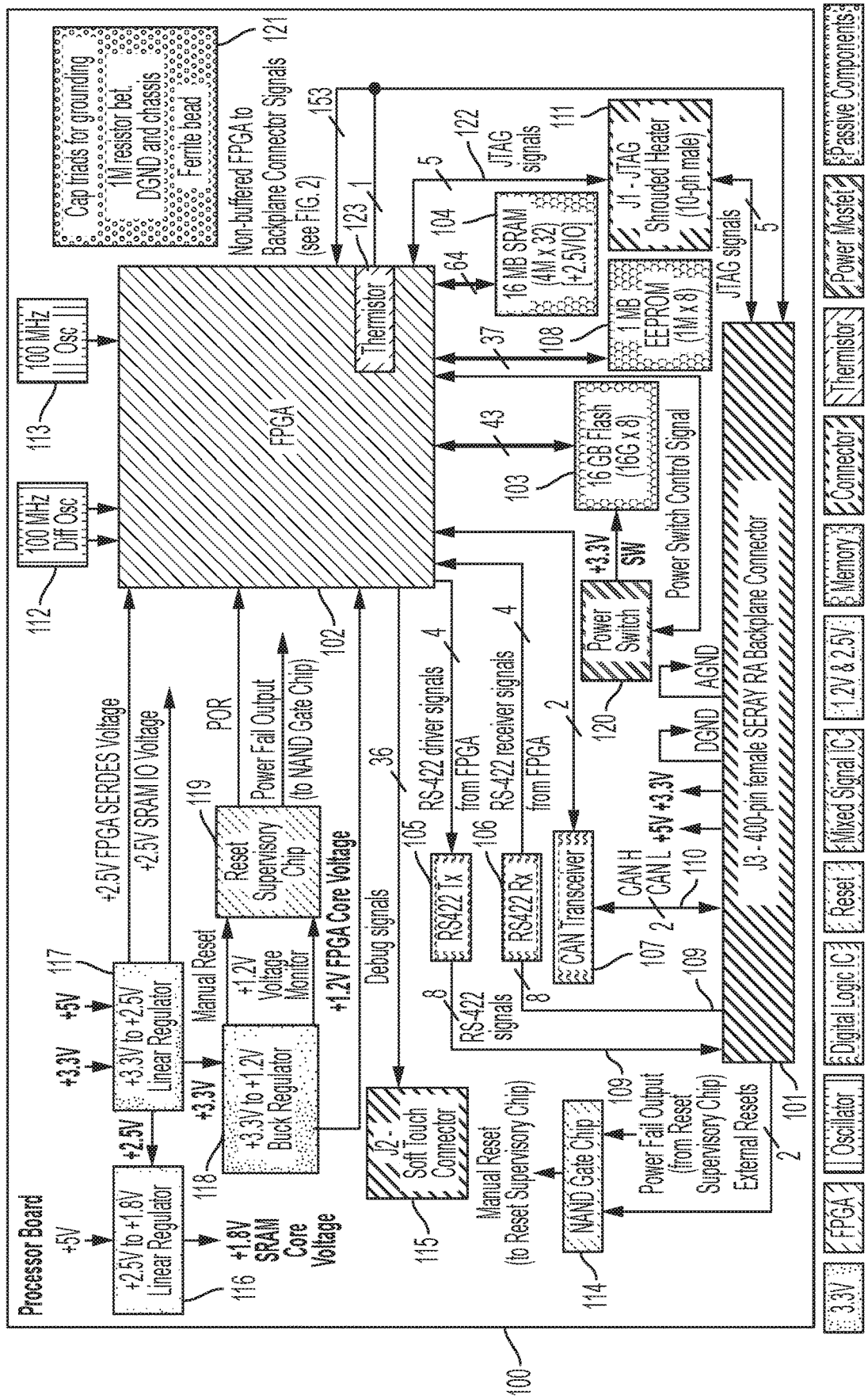
FIG. 1 is a functional block diagram of the modular architecture for a resilient extensible SmallSat (MARES) command and data handling (C&DH) processor card.

In one embodiment, the C&DH core element of the MARES hybrid processing architecture of the present invention includes two design assemblies that process the data associated with basic and essential functions of the spacecraft bus; i.e., the C&DH processor card (see FIG. 1) and the auxiliary card (see FIG. 2), or two boards. In one embodiment, the two boards are used to process the data associated with basic and essential functions of the spacecraft bus. In one embodiment; the two board designs represent C&DH technology which can be used on space missions, and which are shrunk down into a 1U (10 cm×10 cm×10 cm) form factor at the card level, and which can be used in SmallSat spacecraft with a volume as small as 6U (10 cm×20 cm×30 cm).

In one embodiment, the MARES hybrid processing architecture 300 of the present invention (see FIG. 3), which includes the use of the C&DH processor card 303 and, in one embodiment, includes a processor card such as the exemplary NASA-designated "SpaceCube v3.0 Mini Processor Card" 302 or the like (see concurrently filed U.S. patent application entitled "Processor Card and Intelligent Multi-Purpose System for use with Processor Card", the contents of which are herein incorporated by reference) as an optional add-on, has the capability of implementing various algorithms on its hardware as well. The highly integrated MARES architecture 300 of the present invention will reduce size, weight, and power (SWaP) of the bus, leaving more mass, power, and budget for a science payload.

More specifically, in one embodiment, the MARES C&DH hardware 300 (see FIG. 3) of the present invention includes two board designs: a C&DH processor card 100, 303, and a C&DH auxiliary card 200, 304 (see FIGS. 2 and 3), wherein in one embodiment, the processor card 100, 303 and auxiliary card 200, 304 are interdependent, and generally are each required for the other to function. In one embodiment, an optional add-on board, such as the exemplary NASA-designated "SpaceCube v3.0 Mini processor card" 302 or the like (see FIG. 3), a power system electronics (PSE) board 305, and a mission specific special services card (SSC) 301 (i.e., for spacecraft positioning), are also included in the MARES C&DH architecture 300 of the present invention. Thus, in one embodiment, the MARES hardware of the present invention is designed to accommodate multiple configurations depending on the needs of the mission.

In one embodiment, the MARES hardware 300 of the present invention includes a backplane 306 (see FIG. 3) designed to connect whichever processor hoards (i.e., processor board 303, auxiliary board 304, add-on processor board 302 etc.) have been chosen, and mission-specific special services cards (i.e., SSC 301) which are designed to accommodate mission-specific functions and interfaces.

This basic configuration of the MARES hardware of the present invention provides highly reliable C&DH with some basic processing capabilities for missions that want a low power solution in a CubeSat footprint that will be reliable in harsher environments than low earth orbit (LEO). In one embodiment, an external radio (not shown) would be required for communication.

Figure 3:
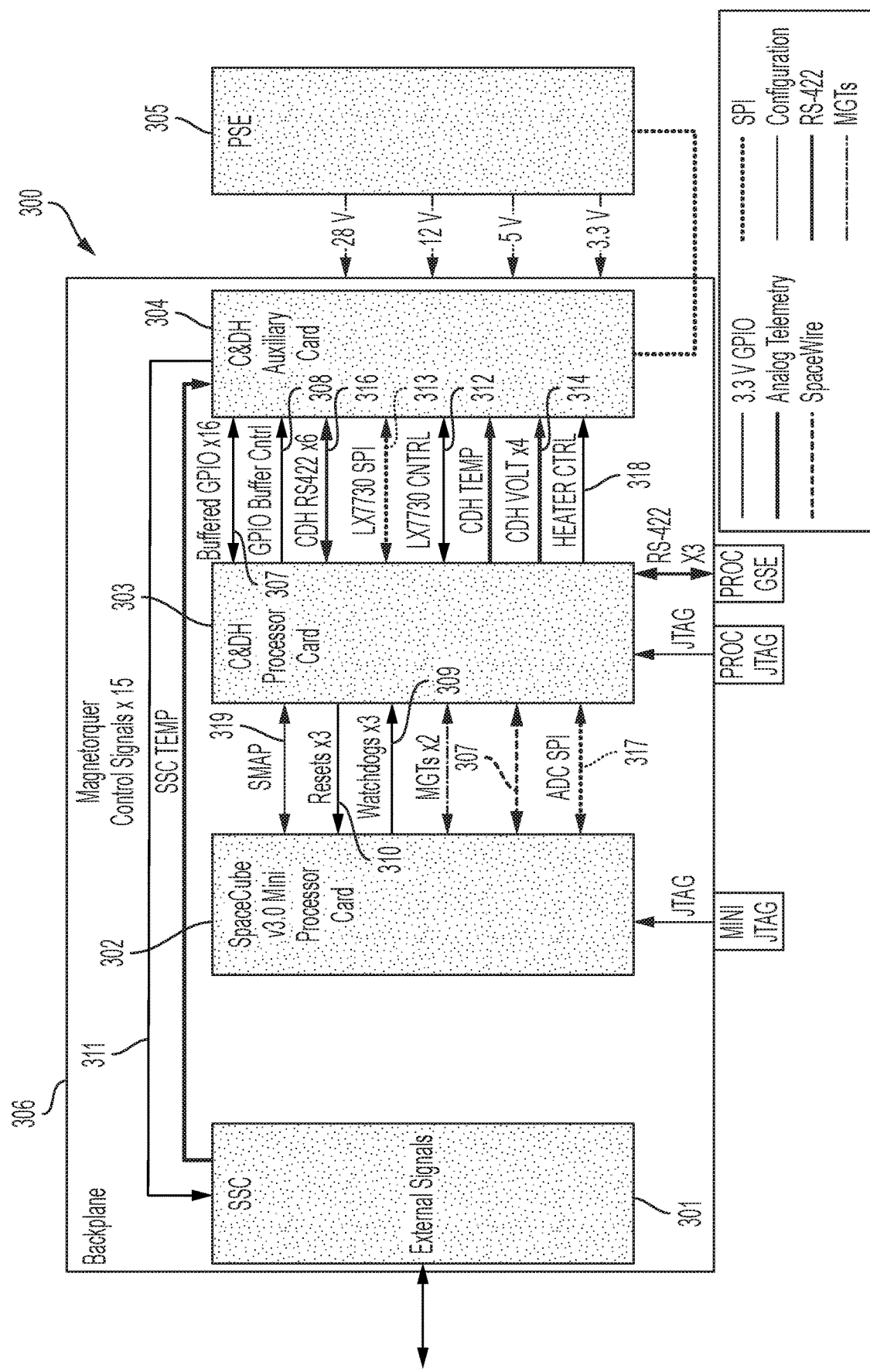
FIG. 3 is a functional block diagram of the MARES C&DH modular architecture including backplane with processor board, auxiliary board, and other selected processor boards.

In one embodiment, the C&DH processor card 100 (see FIG. 1) includes a backplane connector 101, for example, a high density, 400-Pin Samtec SEARAY high speed open pin field array connector 101 or the like, which plugs into the backplane 300 (see FIG. 3). In one embodiment, the backplane connector 101 supports rates up to 12.5 GIL or 25 Gbps, which is significantly faster than the rates that can be sustained by other devices that can be used with the MARES form factor 300 of the present invention.

In one embodiment, the C&DH processor card 100 is equipped with a suitable field programmable gate array (FPGA) 102, such as a Microchip model RTG4 FPGA 102 or the like, having an embedded fault tolerant processor (memory controller) (not shown), such as a LEON-HT processor or the like, which combines to make the board 100 highly reliable in orbit—such as low earth orbit (LEO), geostationary transfer orbit (GTO), and geosynchronous orbit (GEO)—and which is flexible enough to be programmed for custom applications. In one embodiment the programmable FPGA 102 of the present invention provides the flexibility to design according to user needs, and the different interfaces provided are available for use in any mission specific applications. However, the user also may utilize the C&DH processor card 100 with a different embedded processor or can implement a design without any embedded processor per application needs.

In one embodiment, the FPGA 102 of the present invention is radiation tolerant, and is flash-based; which means that once the FPGA 102 is programmed, it does not have to be reconfigured after power is removed. However, more importantly, all design configuration bits are immune to radiation-induced changes. Therefore, the FPGA 102 of the present invention does not require an external device to either reconfigure or monitor it and no background scrubbing of these configuration bits is required. These features allow the user to implement FPGA designs on the MARES C&DH processor card 101 of the present invention for use on missions in orbits with extremely adverse radiation profiles as well as in low earth orbit (LEO) where the radiation environment is more benign in comparison.

In one embodiment, the embedded fault tolerant processor, such as the LEON-3FT processor or the like, of the FPGA 102 of the present invention, is a soft-core processor which can run core flight software (cFS) on a real-time executive for a multiprocessor system (RTEMS) operating system, enabling a standardized flight software (FSW) development flow. The FSW implementation is low risk, based on high-heritage, reusable code that is used on present space missions.

In embodiment, the MARES C&DH processor card 101 of the present invention contains a flash memory device 103, such as a 128 Gb flash memory 103 or the like, that stores algorithms used to implement specified algorithms, such as Attitude Control System (ACS) algorithms, multiple FSW images, and all science data captured by all spacecraft instruments as well as spacecraft housekeeping data. In one embodiment, the flash memory device 103 of the present invention is connected directly to the FPGA 102 to store operating system (OS) boot images and/or finalized or intermediate application data products. In one embodiment, an error correction code (ECC) will be implemented by the embedded fault tolerant memory controller within the FPGA 102 design of the present invention, to preserve data stored in the flash memory device 103.

In one embodiment, the MARES C&DH processor card 101 of the present invention, contains a random-access memory (RAM), such as a 128 Mb static random-access memory (SRAM) 104 or the like, to run the specified applications, such as flight software applications. In one embodiment, the SRAM memory device 104 of the present invention, is connected directly to the FPGA 102. In one embodiment, the SRAM device 104 of the present invention, has a built-in error detection and correction (EDAC) capability that allows the device 104 to internally scrub memory data whenever the FPGA 102 completes a read activity. All single bit errors are corrected by the SRAM device 104 when the read activity is completed.

In one embodiment, the MARES C&DH processor card 100 of the present invention, includes an electrically erasable programmable read-only memory (EEPROM) 108, such as a 1 MB EEPROM 108 or the like, which increases non-volatile memory density used to store the processor card 100 boot code. In one embodiment, an ECC will be implemented by the embedded memory controller within the FPGA 102 to preserve data stored in the EEPROM 108.

In one embodiment, the processor card 100 of the present invention, includes plurality of oscillators, including, for example, a 100 MHz differential oscillator 112 or the like, that is used to implement the multi-Gigabit SERDES interfaces, and a 100 MHz oscillator 113, or the like, that is used as the primary clock resource for the entire FPGA 102 design.

Figure 2:
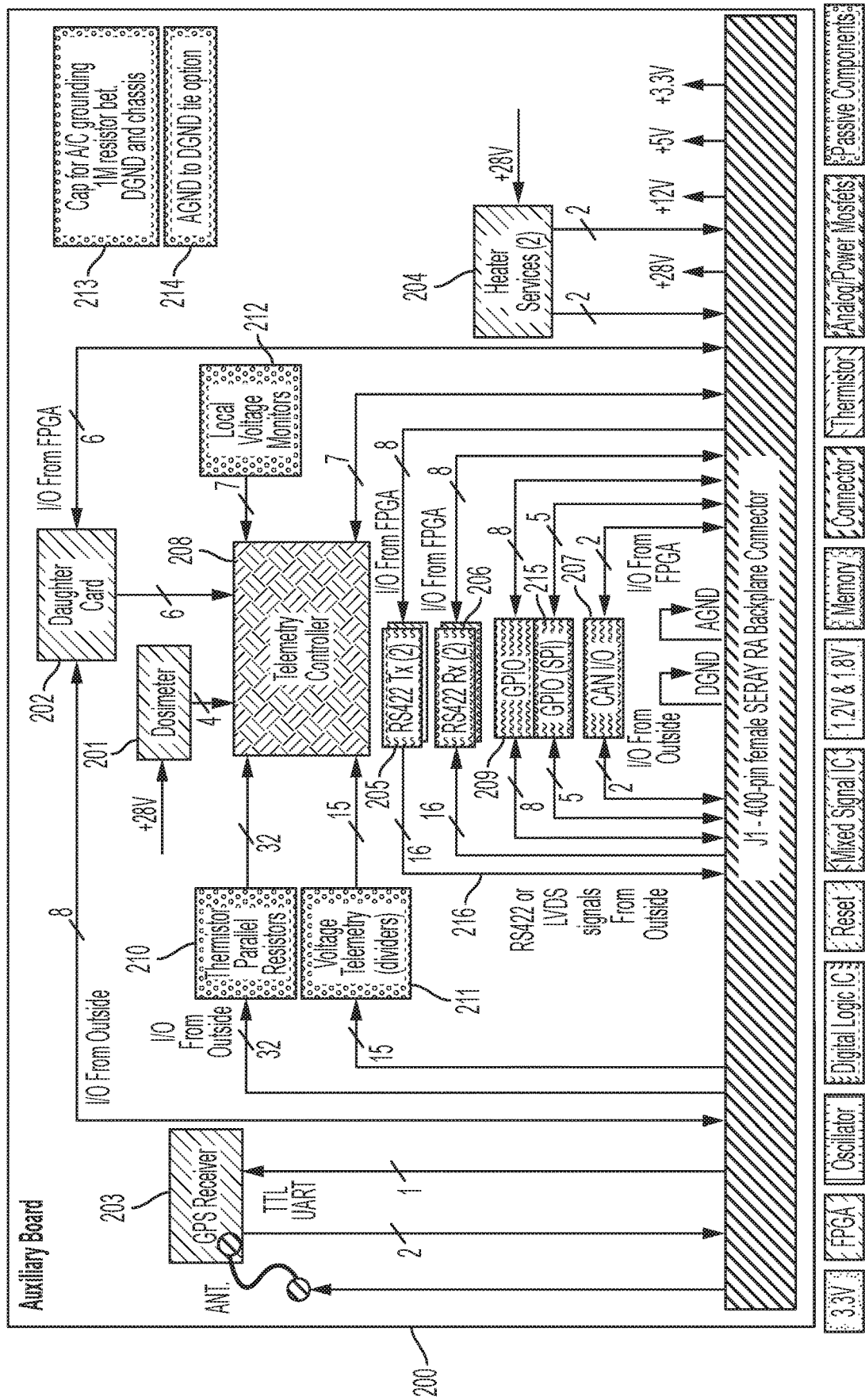
FIG. 2 is a functional block diagram of the modular architecture for a resilient extensible SmallSat (MARES) command and data handling (C&DH) auxiliary card.

In one embodiment, the processor card 100 of the present invention includes other components, including but not limited to:

a NAND gate chip 114 that allows two reset inputs;

a plurality of on-board voltage dividers (see voltage telemetry (dividers) 211 in FIG. 2) to trigger a FPGA 102 logical reset;

a soft touch connector 115 that can be used to monitor up to 36 FPGA 102 design signals at a time for debugging;

a 2.5V to linear regulator 116 to generate the core voltage used by the external SRAM 104;

a 3.3V to 2.5V linear regulator 117 used for the SRAM input/output (IO), and multiple K) and serializer/deserializer (SERDES) banks on the FPGA 102;

a 3.3V to 1.2V buck regulator 118 to generate the core voltage for the FPGA 102 and the soft touch connector 115 signals;

a reset supervisory chip 119 to monitor board voltage levels and provide a reset to the FPGA 102 during brownout conditions and when two external reset signals are actuated;

a power switch 120 capable of power cycling only the flash memory device 103;

a plurality of RS-422 interfaces 105, 106 (i.e., 8× RS-422 pairs 109, which can be configured as low voltage differential signaling (LVDS) pairs), to send driver signals from FPGA 102 to RS-422 transmitter 105, and receive RS-422 signals from RS-422 receiver 106. In one embodiment, multiple RS-422 109 interfaces can be used as processor and software debug interfaces, as well as universal asynchronous receiver-transmitter (DART) interfaces that can be used by external spacecraft components; and a plurality of controller area network (CAN) bus standard interfaces 110 (i.e., two CAN buses), where a CAN transceiver 107 receives signals from the FPGA 102 via the CAN interface.

In one embodiment, the processor card 100, 303 is used in conjunction with an auxiliary card 200, 304 (see FIGS. 2-3), the auxiliary card 200, 304 which contains peripheral interface drivers and read electronics for monitoring the health and safety of the device (i.e., spacecraft).

In one embodiment, in addition to the RS-422 pairs 109 above, the MARES C&DH processor card 100 of the present invention, has a plurality of the interfaces available to users, including, but not limited to, for example:

a plurality of general-purpose input/output (GPIO) pins 209, 307, 308 (see FIGS. 2-3) used to interface the processor card 100 to other components within the host satellite and to the auxiliary card 200, 304;

a plurality of serial peripheral interface (SPI) buses (e.g., GPIO (SPI) 215);

a plurality of LVDS pairs (i.e., 7× LVDS pairs) (see RS422 109 or LVDS 216). In one embodiment, multiple LVDS interfaces can be used as UART interfaces or SpaceWire interfaces 307 (see FIG. 3) that can be used by external spacecraft components;

a plurality of SERDES lanes (i.e., four multi-Gbps SERDES lanes) functional block interfaces (not shown);

a plurality of JTAG signal interfaces 122, 315 (see FIGS. 1 and 3) that are used to program the FPGA 102;

a plurality of analog-to-digital (ADC) converters (i.e., 64 ADC channels) (not shown);

a plurality of Select Mapping of Address and Portal (SelectMAP) masters 319 (see FIG. 3) (i.e., 2× SelectMAP masters);

a pulse-per-second (PPS) configuration interface (not shown);

a plurality of +3.3V low voltage complementary metal oxide semiconductor (LVCMOS) outputs and inputs which can be used to control the two 3-Amp heater services 204 disposed on the auxiliary card 200, to implement reset outputs and spacecraft operation enable outputs and confirmation inputs (i.e., three 3.3V LVCMOS reset outputs 310 (see FIG. 3) and two 3.3V LVCMOS reset inputs (not shown)), and watchdog signals (i.e., three 3.3V LVCMOS watchdog timer inputs 309) (see FIG. 3);

a plurality of H-bridge electronic circuit driver signals 311 (i.e., three 3 H-bridge electronic circuit driver signals), implemented by the ±3.3V LVCMOS signals, that control the spacecraft magnetorquers used as part of the spacecraft ACS, two SPI buses, and one CAN 107 bus that can be used by both spacecraft instruments and other spacecraft interfaces, and one pulse per second (PPS) signal input from the spacecraft GPS 203;

multiple multi-Gigabit SERDES interfaces (not shown) which provide spacecraft instrument data in rates up to 3.125 Gbps to a communications system transmitter capable of sending this data to the ground;

a plurality of SelectMAP master interfaces 319 (i.e., two SelectMAP interfaces 319) (see FIG. 3) which can be connected to up to two processor cards, such as for example, the NASA-designated "SpaceCube v3.0 Mini processor" card 203, 302, and the SSC card 301, in MARES spacecraft architecture 300 implementations that require those cards 302, 301 to be added to the C&DH hardware 300; and a plurality of other components 121, including, but not limited to multiple resistors and capacitors, an ADC SPI; and In one embodiment, the auxiliary card 200 of the present invention, contains additional components, that would be included on the processor board 100, such as a daughter board 202 soldered directly onto the auxiliary card 200.

In one embodiment, the processor card 100, 303 of the present invention, interfaces with the auxiliary card 200, 304 of the present invention, that contains the analog circuitry that converts temperature, voltage, and current data collected from multiple points within a 6U satellite a digital format that can be processed, stored, and downlinked using the front end communication interface.

In one embodiment, the processor card 100 of the present invention, has a single thermistor 123 populated on the FPGA 102 that is used to deliver temperature data to the telemetry controller 208 on the auxiliary card 200.

In one embodiment, the auxiliary card 200 of the present invention, also has multiple miniaturized components including, but not limited to, for example:

a micro-dosimeter 201 used for real-time total ionizing dose (TID) radiation measurements while in flight;

an on-board micro-global positioning system (GPS) device 203 that can be used in lieu of an entire 1U GPS board to provide location and spacecraft time information;

multiple (i.e., 4×) RS-422 pairs 205, 206, 316 that can be used to implement C&DH debug ports for the embedded processor in the FPGA 102 and running diagnostic software on the ground; and a plurality of separate heater services 204 and control 318 that can be used to drive spacecraft heater services using a maximum of 3-Amps on each service via the primary spacecraft power bus;

a telemetry controller 208, such as an exemplary Microchip model LX7730 telemetry controller 208, or the like, on the auxiliary board 200, which allows multiple functions via control signals 312, and SPI 313, to be implemented in a single small device; and an optional daughter card 202 assembly slot that allows a custom printed circuit board to be soldered directly onto the auxiliary card 200.

In one embodiment, the daughter card 202 gives a user the capability to add a custom printed circuit board design and extend on the capabilities of the existing auxiliary card 200 without having to add an entire different board assembly to the MARES C&DH backplane 306.

In one embodiment, the MARES C&DH auxiliary card 200 of the present invention is designed to use a 64-channel multiplexer (not shown) along with a programmable current source (not shown) and a 12-bit analog-to-digital converter (ADC) (not shown) to convert and read all spacecraft telemetry so that it can be processed by the MARES C&DH processor card 100 via a dedicated SPI 308 (see FIG. 3) bus interface. The telemetry controller 208 also has a total of seven voltage comparators (not shown) that are connected to the MARES C&DH processor card 100 that can be used as either enables or confirmation signals for spacecraft operations. The telemetry controller 208 also has a digital-to-analog converter (DAC) (not shown) that can be used as an external interface based on mission needs.

In one embodiment, a buffer device 209, 215, 307, 308 for 16× 3.3V general purpose input/output pin (GPIO) 207, 307 and a plurality of general-purpose input/output (GPIO) pins 209, 308 are utilized, as with a CAN 207.

In one embodiment, a plurality of thermistor parallel resistors 210 are incorporated with the voltage telemetry interface 211 connected to the telemetry controller 208, to give the user flexibility with the type of thermistors 123 that are used in the system, and in order that the voltage telemetry levels measured by the telemetry controller 208 remain within the allowable range.

In one embodiment, local voltage monitors 212, 314 monitor telemetry controller 208.

Finally, multiple capacitors, and a 1M resistor are connected between DGND and chassis 213, and an AGND to DGND tie option 214, are provided to allow the user to implement different grounding schemes including AC coupling, DC coupling, or no coupling grounding options.

In one embodiment, when an optional add-on processor card, such as the NASA-designated "SpaceCube v3.0 Mini" processor card 203, or the like, is present, it enables a large range of additional features. In one embodiment, the processor card 100 of the present invention can program the "SpaceCube v3.0 Mini" processor card 302 with a baseline FPGA 102 design via a SelectMAP 319 interface on the backplane 306. In one embodiment, there are two SelectMAP interfaces 319 from the processor card 303, which allows the C&DH processor card 302 to program up to two other processor cards (i.e., processor cards 301, 302).

In one embodiment, the processor card 100 of the present invention, has the capability to interface with the auxiliary card 200 of the present invention, to expand its functionality by adding analog circuitry that will convert temperature, voltage, and current data collected from multiple points within the host satellite to a digital format that can be processed, stored, and downlinked using the communications interface. In one embodiment, this information shall also be used to determine if a variety of commands will be sent from the processor card 100 to other satellite system interfaces in other to assure the required functionality.

In one embodiment, by using the present invention's FPGA 102, the present invention gives future board design users a great deal of flexibility with their designs. Furthermore, unlike existing reprogrammable COTS FPGA devices, the FPGA 102 of the present invention is designed specifically to withstand the harsh radiation environment in orbits higher than low earth orbit (LEO). In one embodiment, the FPGA 102 is integrated with other components such as COTS or military standard parts.

In one embodiment, the MARES C&DH hardware 300 of the present invention, conforms to a 1U (10 cm×10 cm×10 cm) CubeSat board area form factor (i.e., hardware 300). This form factor is a great improvement over any commercial applications that have either extremely limited enclosure volume constraints or want to take advantage of the various design features of this hardware in even a much larger enclosure volume.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A modular architecture for a resilient extensible space-based SmallSat (MARES) command and data handling (C&DH) device used in a spacecraft, the modular architecture which conforms to a 1U CubeSat board area form factor, comprising:

a C&DH processor card disposed on a backplane of the form factor;

a fault tolerant field programmable gate array (FPGA) disposed on said C&DH processor card, said FPGA including an embedded fault tolerant memory controller, and a soft-core processor which runs core flight software on a real-time executive for a multiprocessor operating system; and a C&DH auxiliary card disposed on said backplane and used in conjunction with said C&DH processor card, to provide processing capability for the spacecraft, said auxiliary card which contains peripheral interface drivers and read electronics for monitoring a health and safety of the spacecraft;

wherein said C&DH processor card interfaces with said C&DH auxiliary card, said C&DH auxiliary card which contains analog circuitry that converts temperature, voltage, and current data collected from multiple points within a 6U satellite to a digital format that is processed, stored, and downlinked using a front end communication interface;

said C&DH auxiliary card further comprising:

a telemetry controller which monitors said health and safety of the spacecraft a micro-dosimeter which monitors real-time total ionizing dose (TID) radiation measurements while in-flight;

an on-board micro-global positioning system (GPS) device including an on-board micro-global positioning system (GPS) device with an architecture emphasing reliability, scalability, and high-performance processing, while also minimizing development cost and schedule of an entire 1U GPS board to provide location and spacecraft time information; and with the MARES C&DH device includes two board designs: a C&DH processor card and a C&DH auxiliary card, the processor card and auxiliary card are interdependent, each required for the other to function, further with an optional add-on board such as the exemplary NASA-designated spaceCube v3.0 Mini processor card and a power system electronics (PSE) board, and a mission specific special services card (SSC) used for spacecraft positioning).

2. The modular architecture for said MARES C&DH device of claim 1, wherein said C&DH processor card further comprises:

an open pin field array backplane connector which plugs said C&DH processor card into said backplane of said form factor.

3. The modular architecture for said MARES C&DH of claim 1, wherein said C&DH processor card further comprises:

a flash memory device directly connected to said FPGA, said flash memory device which stores algorithms and application codes, including code for said flight software, and operating system (OS) boot images; and a power switch capable of power cycling said flash memory device.

4. The modular architecture for said MARES C&DH device of claim 3, wherein an error correction code is implemented by said embedded fault tolerant memory controller within said FPGA to preserve data stored in said flash memory device.

5. The modular architecture for said MARES C&DH device of claim 4, wherein said C&DH processor card further comprises:

a static random-access memory (SRAM) device, directly connected to said FPGA, which runs applications of said flight software;

wherein said SRAM device has a built-in error detection and correction (EDAC) capability which allows said SRAM device to internally scrub memory data upon completion of a read activity of said FPGA.

6. The modular architecture for said MARES C&DH device of claim 5, wherein said C&DH processor card further comprises:

an electrically erasable programmable read-only memory (EEPROM) device which increases a non-volatile memory density used to store a boot code of said C&DH processor card;

wherein an error correction code is implemented by said embedded fault-tolerant memory controller within said FPGA to preserve data stored in said EEPROM device.

7. The modular architecture for said MARES C&DH device of claim 6, wherein said C&DH processor card further comprises:

a plurality of serial interfaces implemented by said FPGA, including:

a plurality of RS-422 interfaces which are configured as low voltage differential signaling (LVDS) pairs, to send driver signals from said FPGA to an RS-422 transmitter and receive an RS-422 signal from an RS-422 receiver; and a plurality of general-purpose input/output (GPIO) signals used to interface said C&DH processor card to said C&DH auxiliary card.

8. The modular architecture for said MARES C&DH device of claim 1, wherein said C&DH auxiliary card further comprises:

a daughter card assembly slot which allows a daughter printed circuit board to be soldered directly onto said C&DH auxiliary card.

9. The modular architecture for said MARES C&DH device of claim 1, said C&DH auxiliary card further comprising:

a plurality of RS-422 transceivers; and a plurality of separate 3-Amp heater services.

10. The modular architecture for said MARES C&DH device of claim 8, said C&DH auxiliary card further comprising:

a plurality of thermistor parallel resistors connected to said telemetry controller;

a voltage telemetry connected to said telemetry controller; and a plurality of local voltage monitors which monitor said telemetry controller.

11. The modular architecture for said MARES C&DH device of claim 1, further comprising a plurality of processor cards disposed on said backplane;

wherein said C&DH processor card programs said plurality of other cards disposed on said backplane.

12. The modular architecture for said MARES C&DH device of claim 5, wherein said C&DH processor card further comprises:

a plurality of linear regulators used with said SRAM; and a buck regulator which generates a core voltage for said FPGA.

13. The modular architecture for said MARES C&DH device of claim 12, wherein said C&DH processor card further comprises:

a reset supervisory chip which monitors C&DH processor board voltage levels and provides a reset for said FPGA.

14. The modular architecture for said MARES C&DH device of claim 7, wherein said plurality of RS-422 interfaces are used as processor and software debug interfaces, and universal asynchronous receiver-transmitter (UART) interfaces.

15. The modular architecture for said MARES C&DH device of claim 14, wherein said C&DH processor card further comprises:

a controller area network (CAN) transceiver; and a plurality of CAN bus interfaces, where said CAN transceiver receives signals from said FPGA via said plurality of CAN bus interfaces.

16. The modular architecture for said MARES C&DH device of claim 15, wherein said C&DH processor card further comprises:
a plurality of low-voltage complementary metal oxide semiconductor (LVCMOS) signal outputs and inputs which are used control two 3 Amp heater services disposed on said auxiliary card, to implement reset outputs, spacecraft operation enable outputs and confirmation inputs, and watchdog signals.

17. The modular architecture for said MARES C&DH device of claim 16, wherein said C&DH processor card further comprises:
a plurality of H-bridge electronic circuit drivers implemented by said LVCMOS signal outputs and inputs, that control the spacecraft.

\* \* \* \* \*